(12) United States Patent
King

(10) Patent No.: US 8,464,657 B1
(45) Date of Patent: Jun. 18, 2013

(54) PET MATTRESS COVER

(76) Inventor: Andrew Wood King, Raleigh, NC (US)

( * ) Notice: Subject to any disclaimer, the term of this patent is extended or adjusted under 35 U.S.C. 154(b) by 0 days.

(21) Appl. No.: 13/437,991

(22) Filed: Apr. 3, 2012

(51) Int. Cl.
*A01K 1/035* (2006.01)

(52) U.S. Cl.
USPC .............................. 119/28.5; 5/500

(58) Field of Classification Search
USPC ................ 119/28.5; 5/482, 490, 499, 500, 5/502, 420, 494, 497, 484
See application file for complete search history.

(56) References Cited

U.S. PATENT DOCUMENTS

| | | | |
|---|---|---|---|
| 4,899,408 A * | 2/1990 | Illingworth | 5/484 |
| 4,922,565 A * | 5/1990 | Blake | 5/484 |
| 5,033,408 A | 7/1991 | Langenbahn | |
| 5,042,099 A * | 8/1991 | Brenner et al. | 5/502 |
| 5,285,542 A * | 2/1994 | West et al. | 5/500 |
| 5,537,952 A | 7/1996 | Devlin | |
| 6,381,778 B1 * | 5/2002 | Peterson | 5/497 |
| 6,922,862 B1 * | 8/2005 | Thompson | 5/691 |
| 7,120,952 B1 * | 10/2006 | Bass et al. | 5/484 |
| 7,185,604 B2 * | 3/2007 | Holte | 119/28.5 |
| 7,487,560 B2 * | 2/2009 | McGrath et al. | 5/488 |
| 8,082,612 B2 * | 12/2011 | Saunders | 5/499 |
| 2006/0060147 A1 | 3/2006 | Appelhans | |
| 2008/0236501 A1 | 10/2008 | Hargrave et al. | |

OTHER PUBLICATIONS

Mattress, Dictionary.com, http://dictionary.reference.com/browse/mattress, Jan. 18, 2012.

* cited by examiner

*Primary Examiner* — Yvonne Abbott
(74) *Attorney, Agent, or Firm* — James G. Passé; Passé Intellectual Property, LLC

(57) ABSTRACT

The present invention relates to a novel pet bed cover. The pet bed cover apprises a four-layer system which wicks moisture to keep the outer layer clean and is fitted to make application to a pet bed easy and secure without disturbing any soiling deposited on the cover.

4 Claims, 2 Drawing Sheets

PET MATTRESS COVER

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to dog or other pet bed covers. In particular, it relates to a 4-layer system for covering a pet's bed mattress.

2. Description of Related Art

The use of pet beds has become increasingly popular. In order to prevent pets such as dogs, cats, or other animals rest directly on furniture, the use of a pet bed is an alternative for pets to sleep on. Pet beds typically consist of some sort of mattress that the animal can lay upon. Many people also allow their pet to sleep on the human mattress in the house and some pet beds are made of the same material as human mattresses.

The problem with any of these types of mattresses as a pet bed is the need to continuously keep the mattress clean, especially from urine, hair, and fecal matter. Accordingly various types of covers have been developed but to date none have completely covered the problem of design for all the different alternative uses for a mattress.

BRIEF SUMMARY OF THE INVENTION

The present invention relates to a pet bed cover for covering a mattress that comprises a 4 layer system and overcomes the general problems of the previous pet bed covers.

Accordingly, in one embodiment the pet bed cover comprises:

a) an outermost layer comprising a non-absorbent soft porous material;

b) a second layer comprising an absorbent material;

c) a third layer comprising a waterproof layer; and d) an innermost layer comprising a fitted sheet material designed to fit the dimension of the mattress.

DETAILED DESCRIPTION OF THE INVENTION

Figure 1:
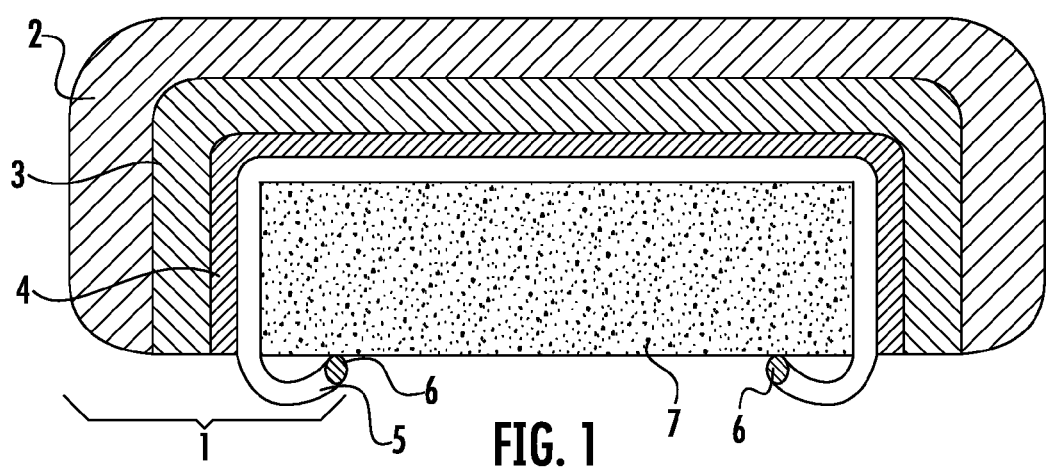
FIG. 1 is a cross sectional view of the device of the present invention on a mattress.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein "pet mattress cover" refers to a cover to be place over any mattress that a pet like a dog, cat, or the like, will be resting or sleeping upon. It includes mattresses intended only for animals and human mattresses (beds) where the animal spends time on the bed. As used herein "mattress" refers to a pad for supporting the reclining body of a mammal such as a dog, cat, or human consisting of a case that is filled with a material for sleeping on such as polymeric material, cotton, straw, foam, rubber, and the like. The mattress will have general dimensions for example human mattresses are rectangular having a straight height, width and depth measurement. However, any shape mattress is contemplated including round, oval, and rectangular.

As used herein the term "outermost layer" is the top layer that the pet will rest or sleep on, i.e. the material that touches the animal. It consists of a non-absorbent porous material that is soft. The softness is utilized, meaning the comfort of the animal, and materials with fur or fur like qualities and the like can be used along with other soft type materials especially for pillow type materials. Any liquid would pass through the material since it is porous and little absorption will occur since the material is essentially non-absorbent. Examples of this material include fleece, wool, cotton, canvas. The material also preferably wicks liquid through to the second layer.

The second layer is the layer immediately underneath and touching the top layer. It is sandwiched in-between the outermost layer and the third layer. It consists of an absorbent material. As used herein "absorbent material" refers to material that will soak up liquids, such as urine, passing through the outermost layer to the second layer. Moisture absorbent materials are ones that are reusable and washable without destruction so one time use materials are not contemplated. Examples of absorbent materials include cotton, polyester-cotton blends, foam board, sponge, absorbent synthetics and others are within the skill in the art in view of the need to absorb moisture like urine.

The third layer is sandwiched between the second layer and the innermost layer and comprises a waterproof material. This layer is designed to prevent any moisture absorbed by the second layer to not pass any further toward the innermost layer than the interface between the second and third layer. Suitable waterproof materials include polymers, rubbers, and the like that are available in sheeting type materials.

The innermost layer is the bottom layer of the cover which comes in contact with the mattress. It consists of a fitted sheet of material. As used herein "fitted sheet" refers to a construction whereby the perimeter of a sheet of cloth (of any material) is sewn or otherwise attached with an elastomer. This is similar to human bedding fitted sheets normally made of cotton or polymer type or combinations thereof sheeting material. The fitted sheet layer allows the cover to remain in place on the mattress so that either animal or human movement on the mattress does not dislodge the cover.

The four layers of material are fastened together by any means known in the art such as sewing and gluing using materials compatible with the layer material selected. The exact size is determined by the mattress dimensions that are selected and essentially the cover is made to size depending on if it is a human mattress or a smaller animal mattress. One skilled in the art of pet bed covers would be able to size the present invention based on the present disclosure.

Now referring to the drawings. FIG. 1 is a cross section of the pet bedding cover fitted on a mattress of a rectangular cross section. As shown, mattress 7 is fitted with cover 1 of the present invention consisting of outermost layer 2, a soft pliable porous non absorbent material which liquids will pass through and away from the top surface. The liquid passing through layer 2 will arrive at second layer 3 which consists of absorbent material for trapping liquids. Third layer 4 consists of a waterproof barrier material such as plastic to prevent moisture from progressing any deeper than third layer 4. The final layer, the innermost layer 5, consists of a fitted sheet having elastomeric band 6 which holds the cover on mattress 7.

Figure 2:
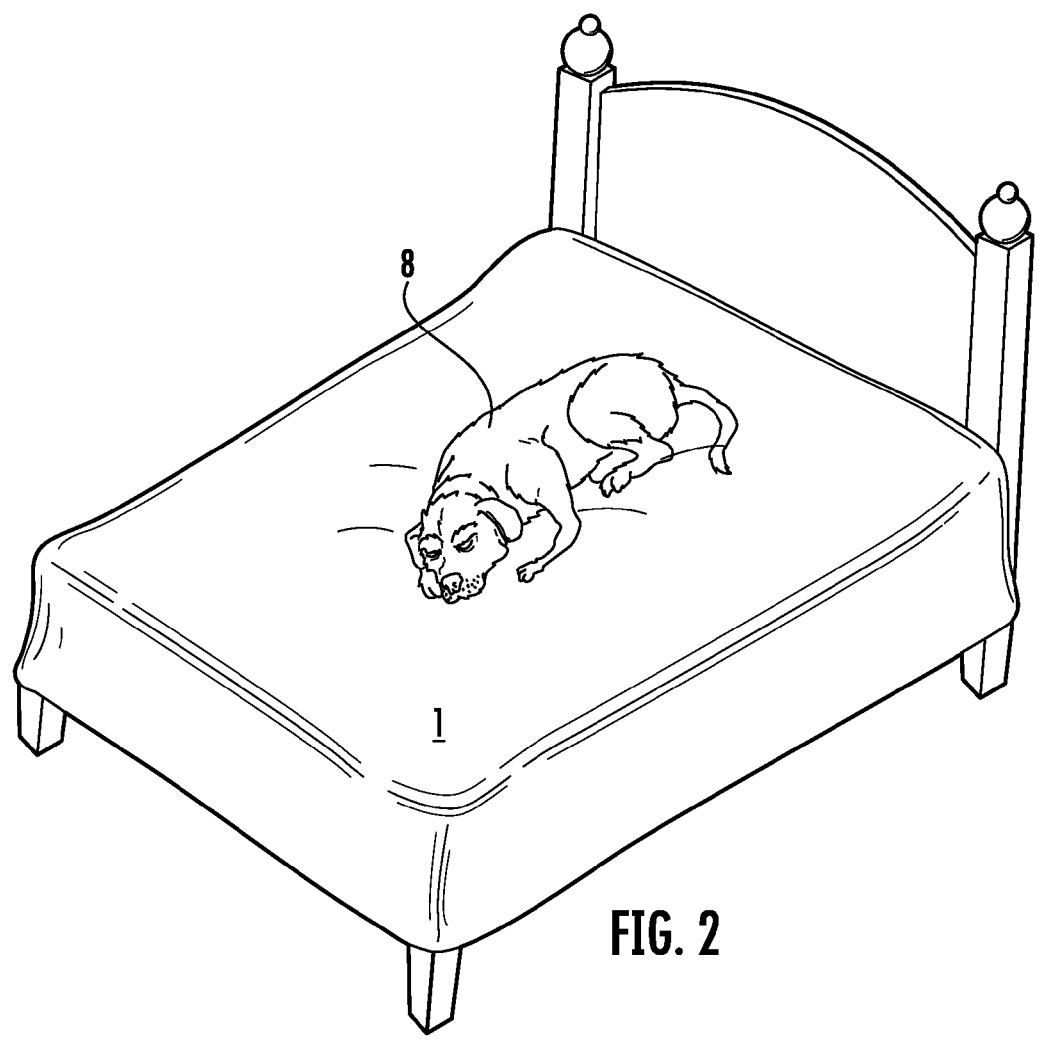
FIG. 2 is a perspective view of the cover over a human sized mattress.

FIG. 2 depicts the pet mattress cover 1 on a large mattress which is not shown since the cover is on top. Dog 8 is shown lying on the mattress and this mattress is sized for humans. Those skilled in the art to which the present invention pertains may make modifications resulting in other embodiments employing principles of the present invention without departing from its spirit or characteristics, particularly upon considering the foregoing teachings.

Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A pet mattress cover for a mattress that a pet will rest upon having a selected dimension comprising:
    a) an outermost layer comprising a nonabsorbent soft porous material that the pet will rest upon;
    b) a second layer comprising an absorbent material;
    c) a third layer comprising a waterproof material; and
    d) an innermost layer comprising a fitted sheet material having an elastomeric band which holds the cover on the mattress and is designed to fit the dimension of the mattress;
    e) wherein each of the layers is positioned on a top surface of the mattress to form four layers on the top surface of the mattress wherein the layers are fastened together in a non-detachable manner.

2. The pet mattress cover according to claim 1 wherein the cover is fitted on a mattress.

3. The pet mattress cover according to claim 2 wherein the mattress is a human mattress.

4. The pet mattress cover according to claim 1 wherein the layers are fastened together by glue or sewing.

* * * * *